Patented Oct. 8, 1929

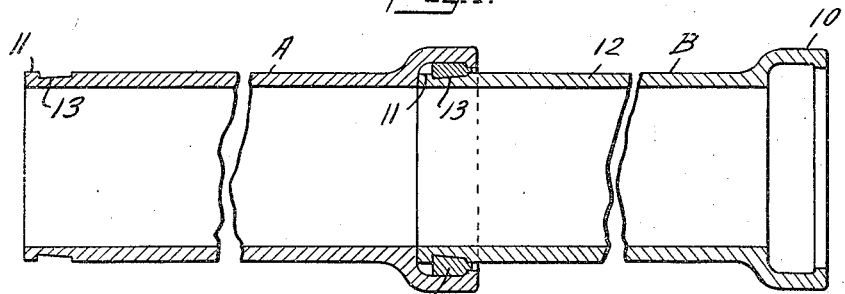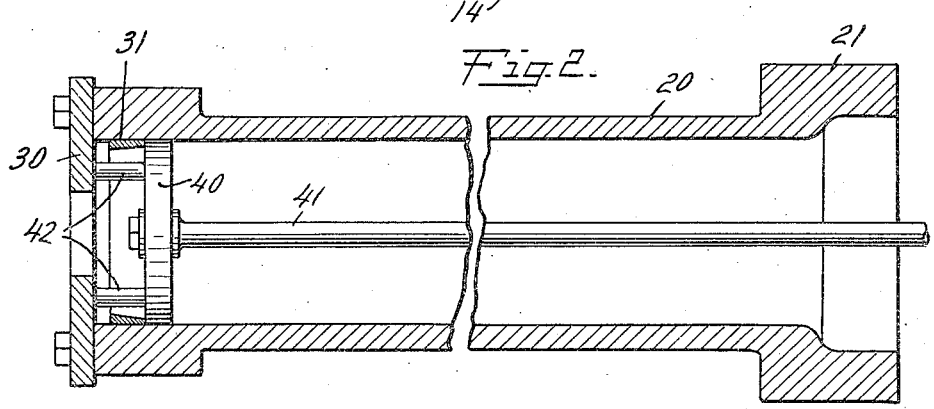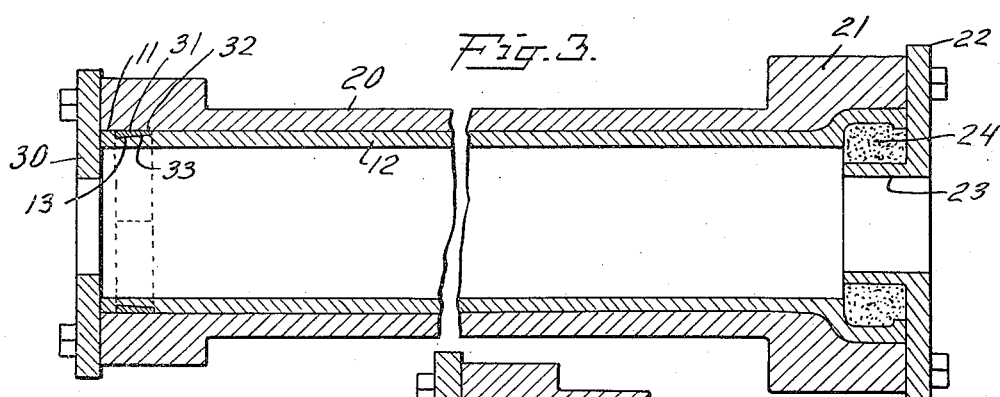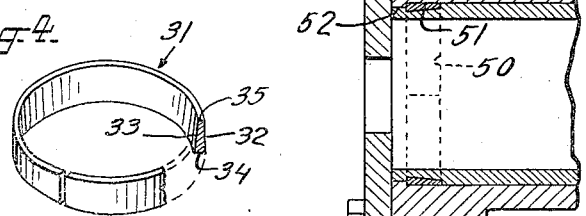

1,730,469

UNITED STATES PATENT OFFICE

WILLIAM H. MILLSPAUGH, OF SANDUSKY, OHIO, ASSIGNOR TO THE PAPER AND TEXTILE MACHINERY COMPANY, OF SANDUSKY, OHIO, A CORPORATION OF OHIO

APPARATUS FOR MAKING PIPES

Original application filed March 16, 1926, Serial No. 95,021. Divided and this application filed June 6, 1928. Serial No. 283,215.

This invention relates to cast pipe and to apparatus for casting pipe and this application is a division of an application Serial No. 95,021, filed March 16, 1926, now Patent No. 1,673,013, granted June 12, 1928.

As is well known, cast pipe is usually provided with an annular bead at one end and with a bell at the other end. When such pipes are joined together, the bead of one pipe is placed in the bell of the adjacent pipe and the joint is caulked with lead or other suitable packing.

The usual construction of cast pipe has its annular bead extending beyond the outer peripheral surface of the pipe or, in other words, the outside diameter of the bead is greater than the outside diameter of the cylindrical portion of the pipe. When such a pipe is cast centrifugally in a non-parting mold, the bead prevents the withdrawal of the pipe longitudinally from the mold.

The invention has for its salient object to provide a tool for positioning a metal core in a centrifugal mold.

Further objects of the invention will appear from the following specification taken in connection with the drawings, which form a part of this application, and in which Fig. 1 is a sectional elevation showing two pipe sections joined together;

Fig. 2 is a longitudinal sectional elevation showing a mold for a centrifugal casting machine and one means for positioning the metal core in the mold;

Fig. 3 is a longitudinal sectional elevation of the centrifugal mold with the metal core positioned therein and the metal cast in the mold;

Fig. 4 is a perspective view of the metal core for forming an annular groove in the pipe; and Fig. 5 is a sectional elevation broken away and showing a slightly modified form of metal core.

The invention briefly described consists of a tool particularly adapted for use in centrifugal casting machines in positioning in a mold of such a machine a ring for forming an annular bead on the article cast in the machine. In forming the bead the ring also forms an annular groove around the article. After the casting has been formed, the cast article and ring can be withdrawn longitudinally from the mold and thereafter the ring can be sprung out or broken out of the groove and removed therefrom.

Further details of the invention will appear from the following description.

In Fig. 1 there are shown two pipes A and B. Each pipe has a bell 10 formed on one end thereof and an annular bead 11 formed at the other end thereof, the intermediate portion or major portion 12 of the pipe being substantially cylindrical. It will be noted that the outer surface of the end portion of the pipe adjacent the bead 11 is tapered toward the axis of the pipe as shown at 13 and it will be further noted that the outside diameter of the bead 11 is substantially the same as the outside diameter of the cylindrical portion 12 of the pipe.

When the pipes or pipe sections are assembled as shown in Fig. 1, the bead 11 of one pipe is disposed within the bell 10 of the adjacent pipe and caulking 14 of lead or other suitable material is placed inside the bell to seal the joint.

Fig. 3 illustrates a metal flask or casing 20 of a centrifugal casting machine having an enlarged end 21 shaped to form the bell end of the pipe. A cap or plate 22 is secured to the end 21 and has an inwardly extending tubular portion 23 which supports a sand core 24 adapted to coact with the end 21 of the mold and form the bell. The plate 22 and sand core 24 can be constructed and supported in any desired manner, for instance, as shown in my Patent No. 1,483,372, granted February 12, 1924.

The opposite end of the flask 20 has secured thereto a plate 30 and a metal core in the form of a split metal ring 31 is located in a position spaced from the end of the mold or flask 20 to which the plate 30 is secured.

The core or ring illustrated in Figs. 2 and 3 is formed of resilient material and has sufficient resiliency to hold it in its proper position and against movement by the molten metal. This ring preferably has a substantially cylindrical outer surface 32 and a tapered inner surface 33, thus forming a tapered groove in the outer surface of the pipe. The sides 34 and 35 are shown as parallel but may have any desired contour.

One form of tool for positioning the metal core in the flask is illustrated in Fig. 2 and consists of a disk 40 having a handle or rod 41 secured thereto and having secured to and projecting from one face, spacing members 42. The members 42 are so dimensioned as to length that they will properly space the metal core 31 from the end of the mold when the free ends of the members 42 engage the plate 30. After the ring or core has been positioned in the mold by means of the tool just described, the tool is withdrawn.

It will be evident from the foregoing description that when the molten metal is poured into the rotating flask 20, the metal will be thrown outwardly by centrifugal force and will form a centrifugal casting having the shape and contour determined by the contour of the mold and in this instance, the casting will have an annular, tapered groove formed therein adjacent one end thereof. This tapered groove will in turn form a bead 11 on the end of the pipe and the outside diameter of the bead will be the same as the outside diameter of the cylindrical portion of the pipe.

If desired, the mold may be so constructed as to form a bead at the end of the pipe having a diameter slightly less than the outside diameter of the pipe and such a core is shown in Fig. 5. In this construction, as in the foregoing, the metal core consists of a split ring 50 formed of resilient material and having a substantially cylindrical outer surface 51. The inner wall of the flask 20 has an annular, inwardly extending flange 52 which reduces the outer diameter of the bead formed on the end of the pipe.

After the casting formed in the centrifugal flask has cooled, the casting and ring can be withdrawn longitudinally from the mold, whereupon the metal core or split ring can be sprung out of or, if necessary, broken out of the groove.

Although one form of tool for inserting the ring and mold has been particularly shown and described, it will be understood that the invention is not limited to the particular characteristics of the tool illustrated, and that changes in the construction and in the arrangement of the various cooperating parts may be made without departing from the spirit or scope of the invention, as expressed in the following claims.

What I claim is:

1. Means for positioning a metal core in a mold, comprising a member adapted to engage and move the core into the mold, and spacing means engageable with an end of the mold for determining the spacing of the core from the end of the mold.

2. Means for positioning a metal core in a mold, comprising a disk adapted to engage and move the core into the mold, and spacing means carried by the disk and engageable with an end of the mold for determining the spacing of the core from the end of the mold.

In witness whereof, I have hereunto set my hand this 5th day of June, 1928.

WILLIAM H. MILLSPAUGH.